Aug. 19, 1941.   G. E. LE COUNT   2,253,183
SPRING DRIVE MECHANISM
Filed Sept. 5, 1940
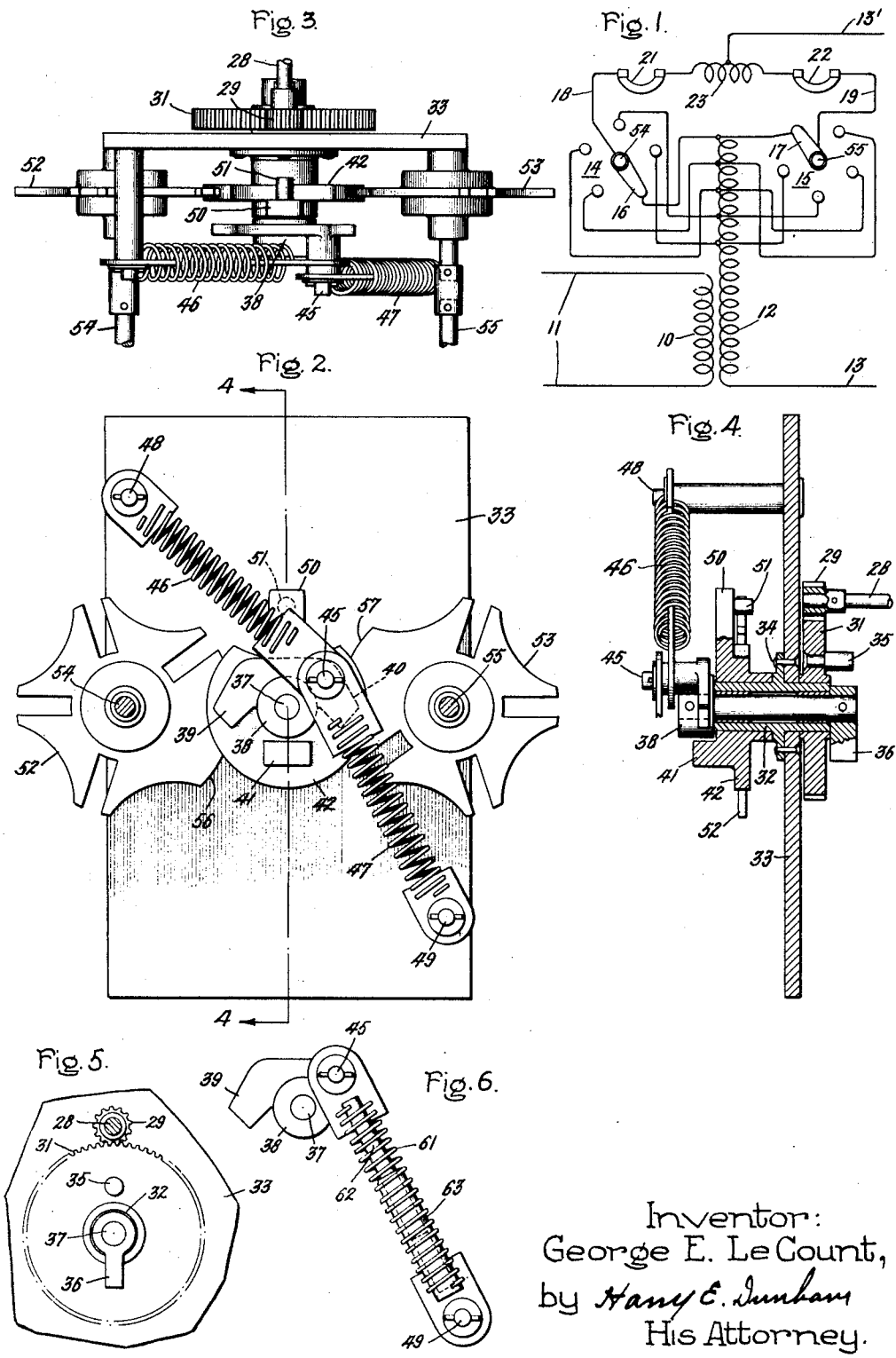
Inventor:
George E. LeCount,
by Harry E. Dunham
His Attorney.

Patented Aug. 19, 1941

2,253,183

UNITED STATES PATENT OFFICE 2,253,183

SPRING DRIVE MECHANISM

George E. Le Count, Pittsfield, Mass., assignor to General Electric Company, a corporation of New York Application September 5, 1940, Serial No. 355,476

5 Claims. (Cl. 74—100)

My invention relates to spring drive mechanisms and while it is not necessarily limited thereto, it is particularly applicable for use with transformer tap-changing apparatus. In such apparatus it is sometimes desired to provide such mechanism for alternately operating a pair of switches with a snap action by a relatively low powered driving means. Arrangements heretofore used for this purpose have been relatively complicated and expensive and it is, therefore, a general object of this invention to provide a new and improved construction and arrangement of spring drive mechanisms of this type.

Further objects and advantages of the invention will occur to those skilled in the art from the following description, taken in connection with the accompanying drawing while the scope of the invention will be pointed out with greater particularity in the appended claims.

In the drawing, in which like reference characters designate the same elements throughout the several views, Fig. 1 is a diagrammatic sketch illustrating a typical transformer tap-changing system including a pair of switches which may be operated in the desired manner through a spring drive of this invention; Fig. 2 is a front elevation of the spring drive mechanism; Fig. 3 is a plan view of the mechanism; Fig. 4 is a cross-sectional view of the mechanism taken along the line 4—4 of Fig. 2; Fig. 5 is a fragmentary view of the reverse side of the mechanism as illustrated in Fig. 2; and Fig. 6 is a fragmentary view illustrating a modification of the invention.

The invention will be described as it may be adapted for operating a pair of switches for transformer tap-changing under load. In Fig. 1 is illustrated a conventional transformer having a primary winding 10 connected to a supply circuit 11 and a secondary winding 12 connected to a load circuit 13—13'. The winding 12 is provided with a plurality of taps, each of which is connected to corresponding contacts of the two contact sets 14 and 15. These contacts are arranged to be cooperatively engaged in a step-by-step manner by the alternately operable switches 16 and 17, respectively, which are connected through parallel branch conductors 18 and 19 and contactors 21 and 22, respectively, to the opposite ends of a reactor winding 23 the midpoint of which is connected to the load circuit conductor 13'. To adjust the voltage ratio of the transformer, or to effect a tap change, one of the contactors 21 or 22 is first opened to interrupt the current in one of the branch conductors. Then the corresponding switch 16 or 17 is moved to the next tap contact and then the contactor reclosed. Since the two switches 16 and 17 will then be connected to different taps, the voltage of circuit 13 will correspond to a voltage midway between the two taps while the circulating short circuit current will be limited by the reactor 23. The second contactor is then opened to interrupt the current in the second branch conductor, after which the corresponding switch arm is shifted to the tap contact corresponding with that engaged by the first switch arm followed by the reclosure of the contactor. The load current will then again divide equally between the two parallel branch conductors while the voltage of the load circuit will have been changed by an amount corresponding to the voltage difference between the transformer taps. By continuing the procedure as outlined, the voltage may be varied as required without at any time interrupting the load circuit.

For operating the switches 16 and 17 in the manner described, it is desirable to use a relatively low powered motor which may also be coupled for selectively operating the contactors 21 and 22 in the proper time phase relation with respect to the operation of the switches 16 and 17. The motor may in turn be controlled both as to energization and direction of operation by a contact-making voltmeter responsive to the voltage of the regulated circuit. Such arrangements are well known in the prior art, one being fully described in the Patent No. 2,112,064 issued to Louis F. Blume, March 22, 1938, and assigned to General Electric Company, the assignee of the present application.

In accordance with this invention, the motor is coupled to the switches through an operating mechanism which includes a spring drive whereby the spring means is slowly stressed in one direction and then released for operating one switch with a snap action through one step and then is slowly stressed in an opposite direction and released for operating the second switch through one step with a snap action. Referring to the drawing, the operating motor or any other suitable driving means (not shown) is adapted to be connected to the mechanism through a shaft 28 upon the end of which is fastened a pinion 29 mounted in engagement with gear 31. The gear 31 is loosely mounted upon the end of the sleeve 32 which extends through a cooperating opening in the supporting plate 33 and is fastened thereto as by rivets 34. The gear 31 is provided with an outwardly extending winding pin 35 secured eccentrically thereto and which upon rotation of the gear is adapted to engage with a lug 36 keyed upon the shaft 37 extending rotatably through the sleeve 32. It will be noted that the lug 36 fastened upon and extending transversely of the end of the shaft acts to retain the gear 31 upon the end of the sleeve 32. Rigidly fastened upon the other end of the shaft 37 for rotation therewith is a crank member 38 having a pair of dogs 39 and 40 integral therewith and on opposite sides with respect to shaft 37, which, depending upon the direction of rotation of the shaft, engage the lug 41 on the Geneva gear driver 42. Loosely secured to the pin 45 fastened to and extending eccentrically from the crank member 38 is a pair of oppositely arranged power springs 46 and 47, the other ends of which are pivotally attached to pins 48 and 49, respectively, extending outwardly from the supporting plate 33 on opposite sides of the shaft 37. The springs 46 and 47 may both be either of the compression or tension type and normally hold the crank member 38 in a first neutral position, as shown in the drawing, or in a second neutral position rotated 180 degrees from that shown. The driver 42 is loosely mounted for free rotation upon the outer surface of the sleeve 32 and is retained thereon by the crank member 38. The driver is provided with an arm 50 having a driving pin 51 for engaging with the slots of the oppositely arranged Geneva gears 52 and 53 which are suitably journalled upon the support 33 and provided with shafts 54 and 55 adapted to be secured to the movable switch contact arms 16 and 17, respectively. The Geneva gears are provided with blank slots 56 and 57, respectively, to preclude movement of the switches beyond the limit positions thereof in either direction.

To alter the ratio of transformation of the transformer, or in other words, to change the tap connections thereof, the driving motor or other means connected to the operating shaft 28 is energized in the proper direction depending upon whether the voltage is to be raised or lowered. Upon rotation of the shaft 28 and the pinion 29 attached thereto, the gear 31 is rotated until the pin 35 engages with the lug 36 attached to the end of shaft 37. Continued rotation of the gear 31 will rotate the shaft and the crank member 38 attached to the opposite end thereof to increase the stress in one of the springs and release that in the other. Assuming that the switches are initially in the limit position shown in Fig. 1 and that the voltage of the load circuit is to be lowered, then the shaft 37 will be rotated in a counterclockwise direction as viewed in Fig. 2. The dog 39, after movement of crank member 38 through an angle somewhat less than 45 degrees, will engage with one side of the lug 41 on the Geneva gear driver 42, and commence to rotate it also in the counterclockwise direction. When the crank member 38 has been rotated through an angle somewhat greater than 90 degrees from the position shown, the spring pivot pin 45 is moved past the dead center position, and the springs will rapidly move crank member 38 and the Geneva gear driver through the next 90-degree arc and snap the Geneva gear 52 through one operative step, and the corresponding switch arm 16 to the next succeeding tap contact. The member 38 will come to rest in the second neutral position 180 degrees from that shown in which the springs will be equally stressed again but on the opposite side of the control shaft 37. Continued rotation of the operating shaft 28 will result in the gear pin 35 again picking up the lug 36 and the stressing of the power springs past the next dead center position following which the Geneva gear driver will be rapidly snapped through the next succeeding 90-degree arc and move the Geneva gear 53 and the associated switch arm 17 to the next tap position, which will correspond with the tap engaged by the arm of switch 16. In this position, the power springs are returned to the illustrated position but each of the Geneva gears and the associated switches will have been operated through one step. It is to be understood, of course, that during the tap charging operation of the switches 16 and 17, the contactors 21 and 22 are also operated in the proper sequence as previously described. Continued energization of the driving motor will result in the switches 16 and 17 being alternately operated in a step-by-step manner over the series of fixed contacts associated with each until the limit positions are reached. Similarly, the switches may be operated in the reverse direction from that described to raise the load circuit voltage.

In Fig. 6 is illustrated a modification of the invention in which the pair of opposed springs 46—47 is substituted by a single compression-tension spring 61 arranged between the rotatable pivot pin 45 of crank member 38 and one of the fixed pins such as 49. Telescopic guide members 62 and 63 suitably secured at their outer ends relative to the adjacent ends of the spring are arranged within the spring to prevent the buckling thereof when it is placed under compression. The spring should be so selected that in the unstressed condition it will hold the crank member 38 in the same neutral positions as the springs 46 and 47 of the previously described modification.

While I have described the spring drive mechanism as it may be adapted for use with a pair of switches that are to be alternately operated, it will be obvious that it is equally applicable for alternately operating other types of devices. Although the invention itself is illustrated and described in what I now consider to be preferred embodiments, it should be understood that the specific details shown are merely exemplary and that the invention may be carried out by other means.

What I claim as new and desire to secure by Letters Patent of the United States, is:

1. A spring drive mechanism for a pair of reversible driven devices comprising a Geneva gear adapted to be connected to each of said devices, a Geneva gear driver arranged between said gears for cooperatively engaging therewith to alternately operate said devices from one position to the next, a crank member for actuating said driver, a power spring attached to said crank member to bias said crank member in either of two angularly opposite neutral positions, and means for rotating said crank member through a predetermined angle from one of said positions whereby said crank member may then be snapped to the opposite neutral position by said spring.

2. A spring drive mechanism for a pair of reversible devices adapted to be operated in a step-by-step manner comprising a Geneva gear connected to each of said devices, a Geneva gear driver arranged between said gears for cooperatively engaging therewith to alternately shift said devices from one operative step to the next, a rotatable crank member, spring means biasing said crank member to either of two opposite neutral positions, means defining a pair of opposed spaced surfaces on said crank member, a part of said driver arranged between said spaced surfaces and adapted to be engaged thereby, and means for rotating said crank member and driver part way from one neutral position to the next, said spring means being thereupon operative for shifting said driver and said crank member to said next neutral position.

3. A spring drive mechanism for a pair of reversible driven devices comprising a Geneva gear adapted to be connected to each of said devices, a rotatable Geneva gear driver arranged for alternately engaging said gears, a crank member for engaging and rotating said driver, over center spring means connected to said crank member for normally biasing said crank member to either of two angularly opposite neutral positions, means for rotating said crank member from either neutral position in either direction past dead center relative to said spring means whereupon said spring means is released for rotating said crank member in the same direction to the next neutral position.

4. A spring drive mechanism for a pair of reversible transformer tap-changing switch devices comprising a Geneva gear for connection to each of said devices, a driver cooperatively arranged between said gears for alternately shifting said devices from one operative position to the next, a shaft having a crank member for actuating said driver, a power spring attached to said crank member normally restraining said crank member in either of two angularly opposite neutral positions, and means for driving said shaft in either direction for stressing said spring and releasing it for rotating said crank member and said driver through a given angular position to shift one of said gears and the associated device through one operative step.

5. A spring drive mechanism for a pair of reversible devices, a Geneva gear connected to each of said devices, a shaft, a power spring attached to a crank on said shaft and adapted normally to hold said shaft in either of two angularly opposite neutral positions, a Geneva gear driver for operating said Geneva gears, means including a pair of spaced driving lugs fastened relative to said shaft for engaging said driver, a transverse lug rigidly fastened to said shaft, a winding pin for cooperatively engaging said lug, and means for driving said pin into engagement with said transverse lug to cause alternate operation of said Geneva gears.

GEORGE E. LE COUNT.